United States Patent
Chang (10) Patent No.: US 6,898,724 B2
(45) Date of Patent: May 24, 2005

(54) SYSTEM FOR LATCHING AN OUTPUT SIGNAL GENERATED BY COMPARING COMPLIMENTARY STROBE SIGNALS AND A DATA SIGNAL IN RESPONSE TO A COMPARISON OF THE COMPLIMENTARY STROBE SIGNALS

(75) Inventor: Chi Chang, Taipei (TW)

(73) Assignee: Via Technologies, Inc., Taipei (TW)

( * ) Notice: Subject to any disclaimer, the term of this patent is extended or adjusted under 35 U.S.C. 154(b) by 566 days.

(21) Appl. No.: 10/140,995

(22) Filed: May 9, 2002

(65) Prior Publication Data

US 2002/0174373 A1 Nov. 21, 2002

Related U.S. Application Data

(60) Provisional application No. 60/291,253, filed on May 15, 2001.

(30) Foreign Application Priority Data

Dec. 25, 2001 (TW) .................................. 90132243 A (51) Int. Cl.$^7$ ................................ G06F 1/04; H04J 3/06
(52) U.S. Cl. ......................... 713/500; 370/503; 330/252
(58) Field of Search ......................... 713/500; 370/503; 330/252

(56) References Cited

U.S. PATENT DOCUMENTS

| | | | | |
|---|---|---|---|---|
| 4,460,874 A | * | 7/1984 | Haque | 330/261 |
| 5,117,199 A | * | 5/1992 | Wang et al. | 330/252 |
| 6,011,435 A | * | 1/2000 | Takeyabu et al. | 330/252 |
| 6,563,348 B1 | * | 5/2003 | Beck et al. | 327/94 |
| 6,590,429 B2 | * | 7/2003 | Choi et al. | 327/74 |
| 6,700,438 B2 | * | 3/2004 | Chang et al. | 327/562 |
| 6,753,701 B2 | * | 6/2004 | Chang | 326/93 |
| 2002/0186717 A1 | * | 12/2002 | Haq et al. | 370/503 |

* cited by examiner

Primary Examiner—Thomas Lee
Assistant Examiner—Mark Connolly
(74) Attorney, Agent, or Firm—Rabin & Berdo, P.C.

(57) ABSTRACT

A data transmission system using a pair of complement signals (STROB/STROB#) as an edge-aligned strobe signal and input/output buffers therein. Several data signals and a pair of STROB/STROB# signals are transmitted from a data output device to a data input device therein. These data signals and the STROB/STROB# signals are edge-aligned and transmitted through the same transmission architecture. The data input device includes several data comparators for generating output signals from the received data signals using the received STROB/STROB# signals as a dynamic reference voltage. In addition, the data input device further includes several comparators and delay elements for generating a pair of non-inverting/inverting latch clock signals from the STROB/STROB# signals. Each of the output signals is sent to two data latch circuits for outputting two latched data based on the latch clock signals.

16 Claims, 7 Drawing Sheets

SYSTEM FOR LATCHING AN OUTPUT SIGNAL GENERATED BY COMPARING COMPLIMENTARY STROBE SIGNALS AND A DATA SIGNAL IN RESPONSE TO A COMPARISON OF THE COMPLIMENTARY STROBE SIGNALS

This application claims the benefit of U.S. provisional No. 60/291,253 filed May 15, 2001.

BACKGROUND OF THE INVENTION

1. Field of the Invention

The present invention relates to an electronic circuit technology, more specifically, to a data transmission system using a pair of complementary signals as an edge-aligned strobe signal and input/output buffers therein.

2. Description of the Prior Art

Conventional high-speed input/output buses employ a pseudo-differential scheme or a fully differential scheme to restore small swing signals back to full swing of logic "1" or "0." These data will be latched by synchronous clocks or strobe signals sent from the transmitter. The difference between the pseudo-differential data comparator and the fully differential data comparator is described as follows.

Figure 1A:
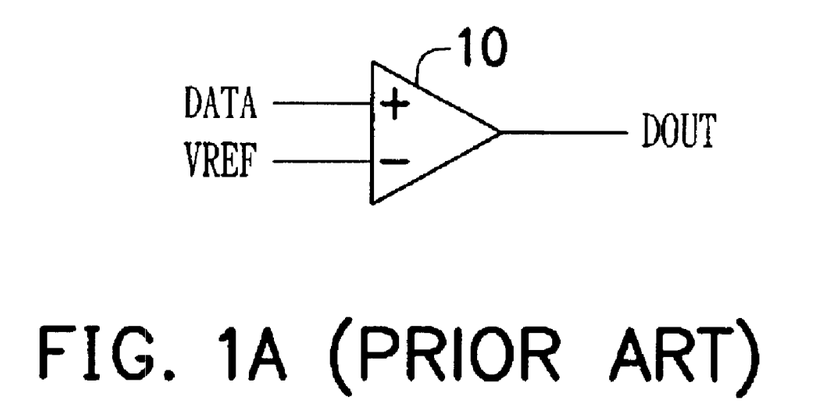
FIGS. 1A and 1B (Prior Art) are a circuit diagram and a timing diagram of the conventional pseudo-differential data comparator, respectively.
Figure 1B:
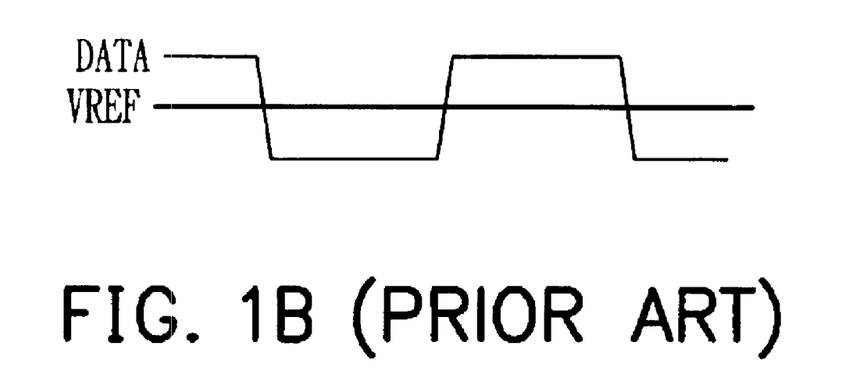
Figure 2A:
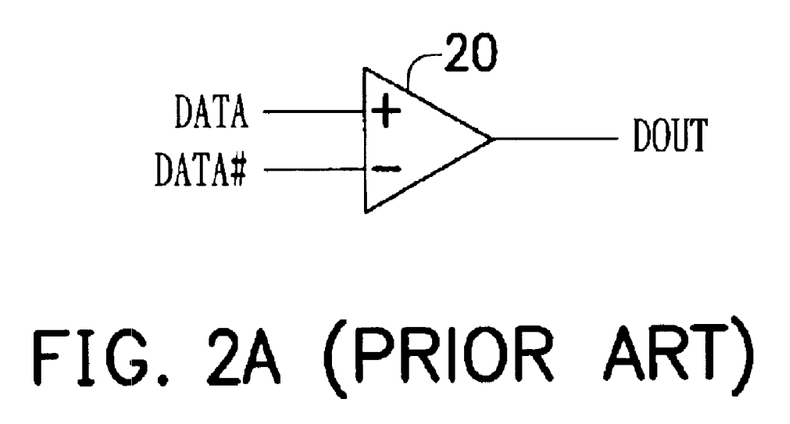
FIGS. 2A and 2B (Prior Art) are a circuit diagram and a timing diagram of the conventional fully differential data comparator, respectively.
Figure 2B:
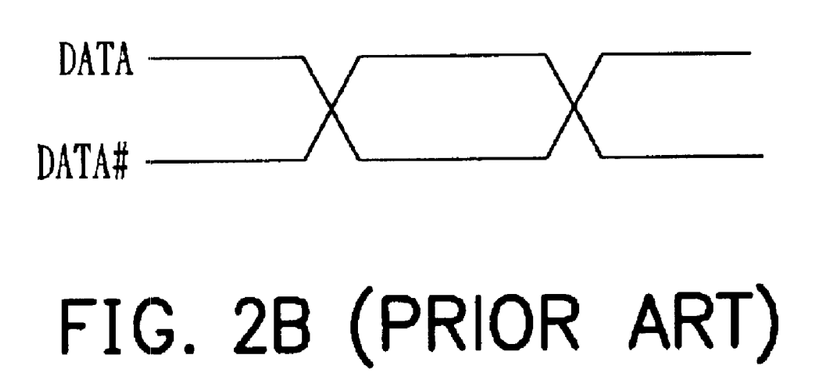

FIGS. 1A and 1B (Prior Art) are a circuit diagram and a timing diagram of the conventional pseudo-differential data comparator, respectively. As shown in the figures, the pseudo-differential data comparator 10 receives a data signal (DATA) and a reference voltage (VREF). The logic level of the data signal (DATA) is determined by comparing the data signal (DATA) with the reference voltage (VREF) and then generates the output signal (DOUT). On the other hand, FIGS. 2A and 2B are a circuit diagram and a timing diagram of the conventional fully differential data comparator, respectively, which is different from the conventional pseudo-differential data comparator in their received signals. The conventional fully differential data comparator receives a non-inverting data signal (DATA) and its inverse signal (DATA#), which constitute a differential signal. The output signal (DOUT) is determined by comparing the non-inverting data signal (DATA) and the inverting data signal (DATA#).

However, both of the conventional data comparators still suffer from some drawbacks. In the pseudo-differential scheme, the slew rate of the data signal (DATA) and the variation of the reference voltage (VREF) will affect the output timing of the output signal (DOUT), which is unfavorable to the applications of high-speed I/O buses. In the fully differential scheme, every data signal requires two pins to send the original and its inverse signal, which can cause a limitation in current chip design where the die size and the substrate ball-out are restricted.

In addition, when the data signal is transmitted to the receiver through the transmission line, a skew may occur due to various environmental factors, such as simultaneous switching output (SSO) effect, signal coupling, crosstalk, multiple routing paths and power/ground noises. Accordingly, data sampling is liable to be erroneous if the skew is larger.

SUMMARY OF THE INVENTION

Therefore, the objective of the present invention is to provide a data transmission system which utilizes a pair of complementary signals as a reference voltage of the data comparator to overcome the drawbacks of the conventional pseudo-differential and fully differential schemes, and uses the pair of complementary signals as an edge-aligned strobe signal for data sampling at the receiver and adds a delay mechanism to prevent erroneous sampling caused by the skew.

The present invention achieves the above-indicated objects by providing a data transmission system. The data transmission system includes a data output device (transmitter), a data input device (receiver) and a plurality of transmission lines coupled therebetween. The data output device has a plurality of transmitter circuits coupled to one end of the transmission lines for transmitting several data signals, a non-inverting signal and an inverting signal. Falling/rising edges of the data signal are aligned with the falling/rising edges of the pair of complementary signals (the non-inverting signal and the inverting signal). The data input device, which is coupled to the other ends of the transmission lines, includes a first comparator, a second comparator, a third comparator, a first delay element, a second delay element, a first data latch circuit and a second data latch circuit. The first comparator is a four-input comparator for receiving one of the data signals, the non-inverting signal and the inverting signal. The non-inverting signal and the inverting signal, is used as a dynamic reference voltage in the first comparator. Thus, the function of the first comparator is to compare twice the data signal with the sum of the non-inverting signal and the inverting signal and output an output signal according to its comparison result. A sum of the non-inverting signal and the inverting signal is a constant.

The second comparator and the third comparator are used to compare the non-inverting signal and the inverting signal and to generate a pair of non-inverting/inverting sampling control signals, respectively. The first delay element and the second delay element delay the non-inverting/inverting sampling control signals, respectively, by a first delay time and a second delay time, and generate a pair of non-inverting/inverting latch clock signals. A group of the first data latch circuit and the second data latch circuit receive the same output signal from the first comparator and generate a first latched data and a second latched data based on the non-inverting/inverting latch clock signals, respectively. If the numbers of the first/second data latch circuits are more than one, CTS branching devices are required to distribute the non-inverting/inverting latch clock signals to the corresponding first/second data latch circuits.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

The present invention discloses a novel data transmission system, which employs a pair of complementary signals as an edge-aligned strobe signal and its input/output buffers. The novel data transmission system uses the same structure of the output circuits and the I/O pads designed for the transmission of the data signals to transmit the pair of complementary signals, the falling/rising edges of which are aligned with those of the data signals. The pair of complementary signals are used to substitute for the conventional constant reference voltage, thereby solving the drawback of the conventional pseudo-differential scheme and the conventional fully differential scheme. As well, at the receiver, a delay element is inserted and used to compensate for the skew amount in the transmitted data signals.

Figure 3:
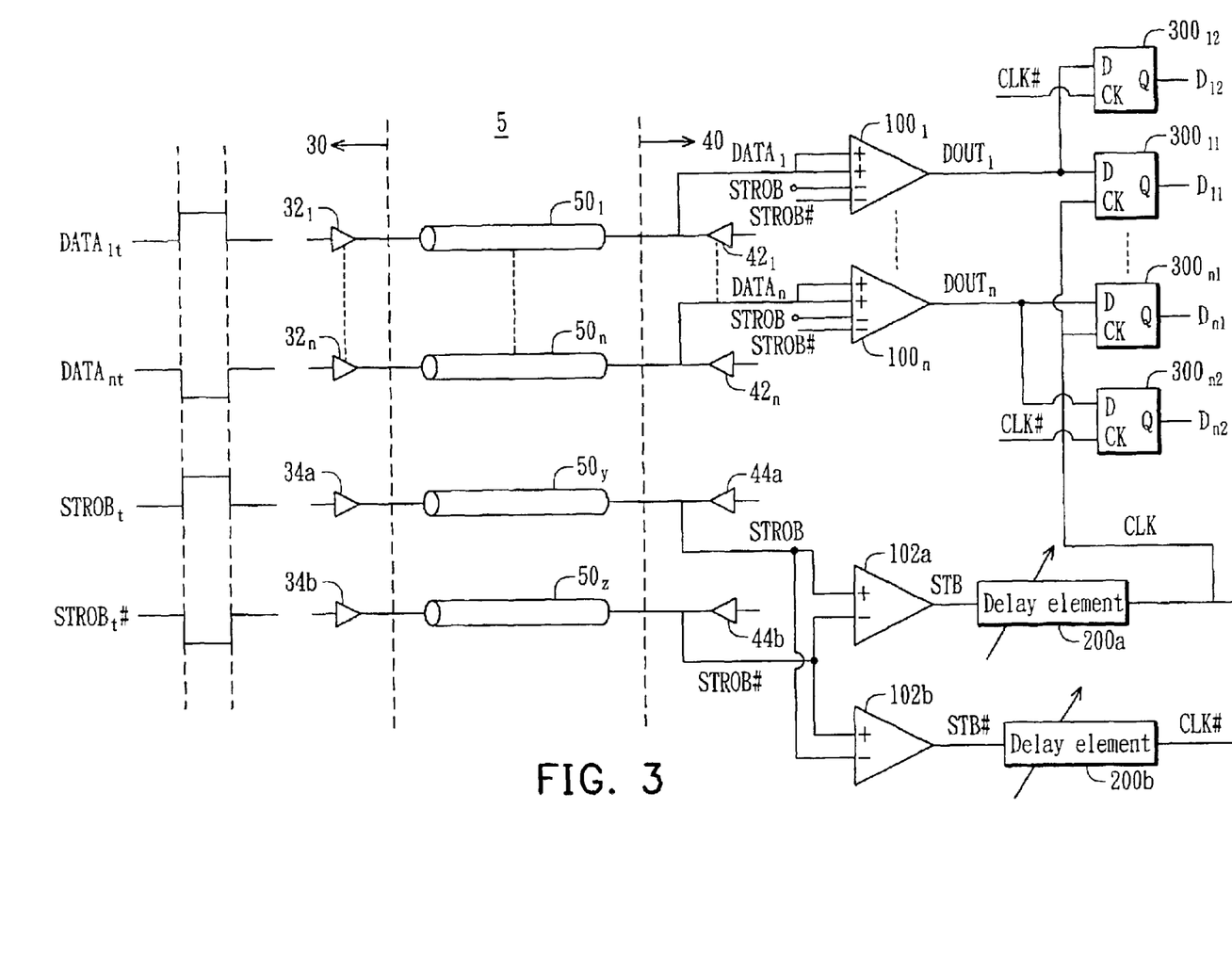
FIG. 3 is a block diagram of the data transmission system using a differential signal as an edge-aligned strobe signal according to the preferred embodiment of the present invention.

The data transmission system of the preferred embodiment of the present invention is described as follows. FIG. 3 is a block diagram of the data transmission system 5 according to the preferred embodiment of the present invention. As shown in the figure, the data transmission system 5 includes a data output device 30, a data input device 40 and several transmission lines $50_1 \sim 50_n$, $50_y$ and $50_z$ connected between the data output device 30 and the data input device 40.

Data output device 30 includes a plurality of transmission circuits $32_1 \sim 32_n$, 34a and 34b of the same kind, which transmit data signal ($DATA_{1t} \sim DATA_{nt}$) and non-inverting/inverting strobe signals (STROB/STROB#), respectively. Especially, the falling/rising edges of the non-inverting/inverting strobe signals (STROB/STROB#) are aligned with the falling/rising edges of the data signals ($DATA_{1t} \sim DATA_{nt}$). The selections of using the same circuit structure of transmission circuits for the strobe signals and the data signals and using the edge alignment of the strobe signals and the data signals are to obtain a superior differential relation between each of the data signals $DATA_{1t} \sim DATA_{nt}$ and the non-inverting/inverting strobe signals (STROB/STROB#), which is favorable to the cancellation of the common-mode noises therebetween.

Data input device 40 includes a plurality of transmission circuits $42_1 \sim 42_n$, 44a and 44b, data comparators $100_1 \sim 100_n$, differential comparators 102a and 102b, delay elements 200a and 200b, and data latch circuits $300_{11} \sim 300_{n1}$ and $300_{12} \sim 300_{n2}$. Transmission circuits $42_1 \sim 42_n$, 44a and 44b have the same circuit structure as those of transmission circuits $32_1 \sim 32_n$, 34a and 34b, for providing bidirectional data transmission and reception. Each of the data comparator $100_1 \sim 100_n$ has four input terminals, including two positive input terminals denoted by "+" and two negative input terminals denoted by "−". The two positive input terminals receive the corresponding data signal from DATA1~DATAn and the two negative input terminals receive the non-inverting/inverting strobe signals (STROB/STROB#) serving as a dynamic reference voltage. The detailed operation of the data comparator $100_1 \sim 100_n$ will be described later. Differential comparators 102a and 102b are coupled to transmission lines $50_y$ and $50_z$ and used to compare the amplitudes of the non-inverting/inverting strobe signals (STROB/STROB#). The positive/negative input terminals of the differential comparator 102a receive the non-inverting strobe signal (STROB) and the inverting strobe signal (STROB#) and its output terminal outputs a non-inverting sampling control signal STB. The positive/negative input terminals of the differential comparator 102a receive the inverting strobe signal (STROB#) and the non-inverting strobe signal (STROB) and its output terminal outputs an inverting sampling control signal (STB#). Delay elements 200a and 200b delay the non-inverting/inverting sampling control signals (STB/STB#) by a delay time and generate non-inverting/inverting latch clock signals (CLK/CLK#), respectively. The delay time is adjustable and designed to compensate for the skew between the data signals and the strobe signals. Each of the data output signal ($DOUT_1$)~($DOUT_n$) is assigned to two corresponding data latch circuits $300_{11} \sim 300_{n1}$ and $300_{12} \sim 300_{n2}$, which are used to produce latched data $D_{11} \sim D_{n1}$ and $D_{12} \sim D_{n2}$. For example, data latch circuits $300_{n1}$ and $300_{n2}$ are used to process the data output signal ($DOUT_n$) and are controlled by non-inverting/inverting latch clock signals (CLK/CLK#) to produce the latched data $D_{n1}$ and $D_{n2}$. Since the non-inverting/inverting latch clock signals (CLK/CLK#) are distributed to several data latch circuits, an additional CTS (Clock Tree Synthesis) branching devices (not shown) can be used to distribute the non-inverting/inverting latch clock signals (CLK/CLK#) to control the skew.

In the data transmission system of the preferred embodiment, the data output device 30 sends a pair of complementary signals (STROB/STROBE#) accompanying the data signals to the data input device 40. In addition, the pair of complementary signals (STROB/STROBE#) and the data signals are transmitted by the transmission circuits of the same circuit structure and aligned with their falling/rising edges, which make them form a fine differential relation. On one hand the pair of complementary signals (STROB/STROBE#) are used as a dynamic reference voltage in the data comparator $100_1 \sim 100_n$, and on the other, they are used as input signals of the differential comparator 102a and 102b. After a delay process compensating for the skew, the output signal of the differential comparator 102a and 102b are used as latch clock signals to latch data.

Figure 4:
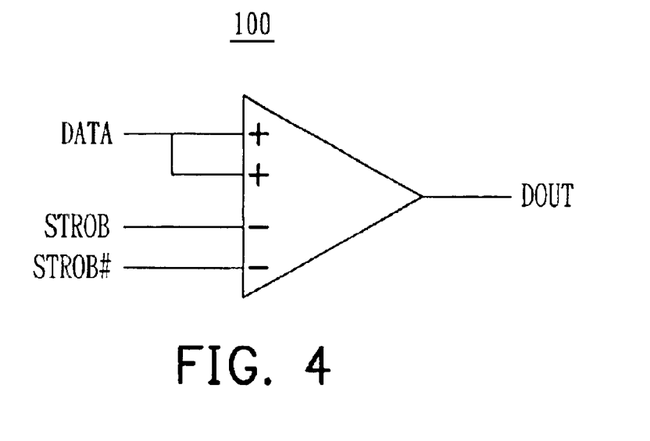
FIG. 4 is a schematic diagram of the data comparator according to the preferred embodiment of the present invention.

The data comparators $100_1 \sim 100_n$ of the preferred embodiment are described in detail as follows. FIG. 4 is a schematic diagram of one of the data comparators $100_1 \sim 100_n$ (denoted by numeral 100) in the preferred embodiment. The data comparator 100 has four input terminals, including two positive input terminals (denoted by "+") for receiving the corresponding one of the data signal ($DATA_1 \sim DATA_n$) (denoted by a symbol DATA) and two negative input terminals (denoted by "−") for receiving the non-inverting/inverting strobe signals (STROB/STROB#). As described above, the non-inverting/inverting strobe signals (STROB/STROB#) are complementary and periodic signals. The function of the data comparator 100 is to compare twice the data signal (DATA) with the sum of the non-inverting/inverting strobe signals (STROB/STROB#) and to produce the output signal (DOUT) according to the comparison result.

Figure 5:
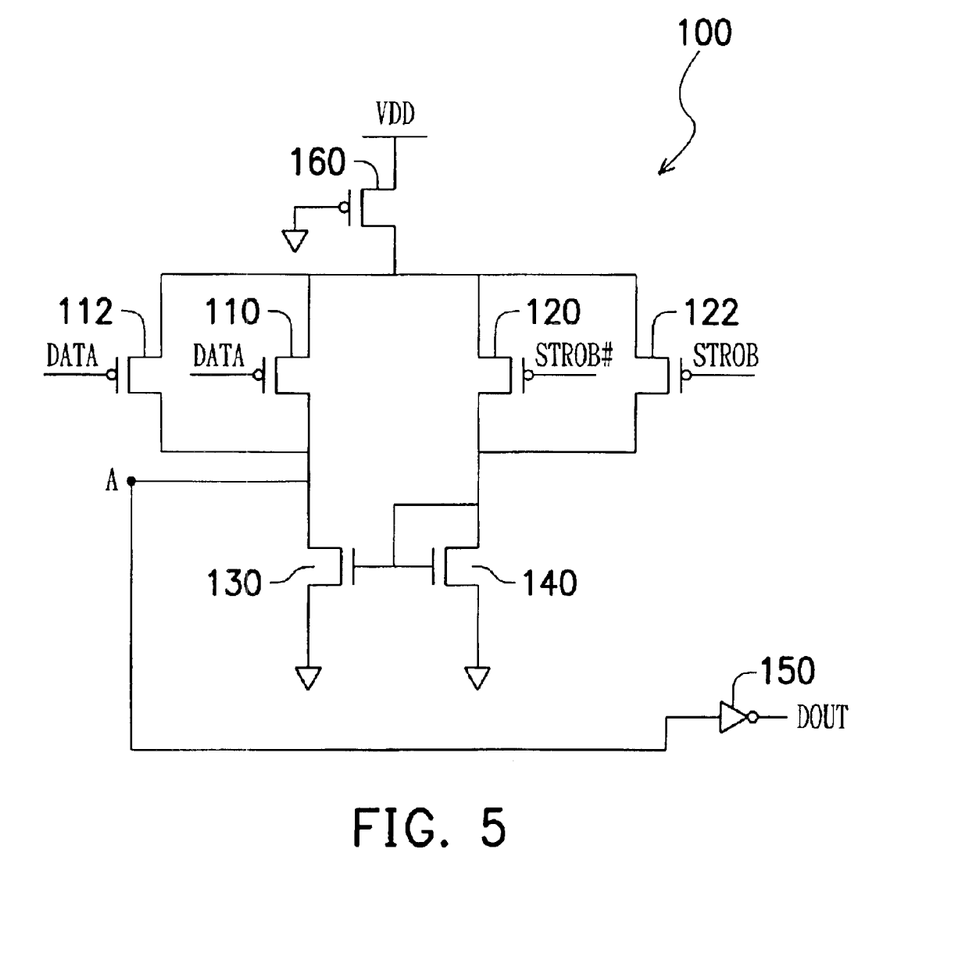
FIG. 5 is a detailed circuit diagram of the data comparator according to the preferred embodiment of the present invention.

FIG. 5 is a detailed circuit diagram of the data comparator 100 according to the preferred embodiment. It is noted that FIG. 5 only illustrates one possible embodiment of the data comparator in the present invention. As shown in FIG. 5, data comparator 100 includes a PMOS transistor 160 serving as a current source, four PMOS transistors 110, 112, 120 and 122 for receiving two sets of the data signal (DATA) and the non-inverting/inverting strobe signals (STROB/STROB#), and two NMOS transistors 130 and 140 serving as a load in a current mirror structure. In addition, an additional inverter 150 is used to generate the output signal (DOUT) since the voltage at terminal A and the data signal (DATA) are out of phase.

According to FIG. 4 and FIG. 5, data comparator 100 uses the non-inverting/inverting strobe signals (STROB/STROB#) as a dynamic reference voltage for sampling the data signal (DATA). In fact, no matter what the logic state of the data signal (DATA) is, such as "1" or "0", there is a constant voltage difference between the twice data signal (DATA) and the sum of the non-inverting/inverting strobe signals (STROB/STROB#).

Figure 6:
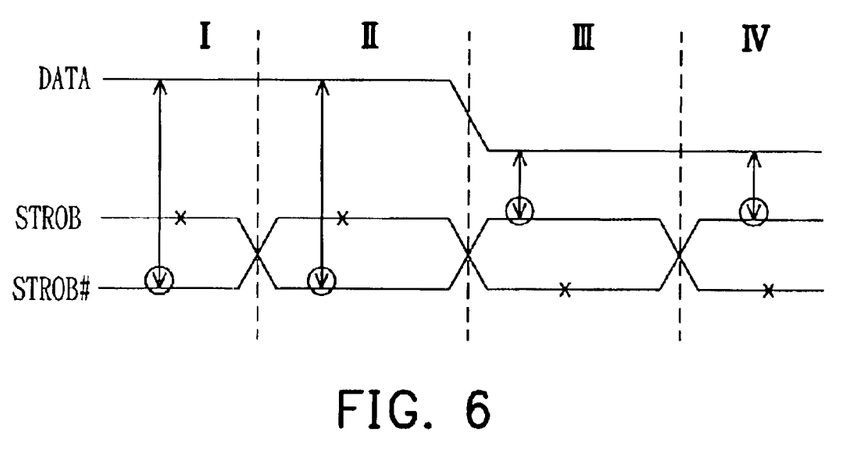
FIG. 6 is a schematic diagram illustrating the relationships between the received signals and the output signal of the data comparator in the preferred embodiment of the present invention.

FIG. 6 is a schematic diagram illustrating the relationships between the non-inverting/inverting strobe signals (STROB/STROB#) and the data signal (DATA) in the preferred embodiment. If the amplitudes of the data signal (DATA) and the non-inverting/inverting strobe signals (STROB/STROB#) vary between +Vf and −Vf, four cases occur:

(I) The amplitude of the data signal (DATA) is +Vf and the amplitudes of the non-inverting/inverting strobe signal (STROB/STROB#) are +Vf and −Vf, respectively;

(II) The amplitude of the data signal (DATA) is +Vf and the amplitudes of the non-inverting/inverting strobe signal (STROB/STROB#) are −Vf and +Vf, respectively;

(III) The amplitude of the data signal (DATA) is −Vf and the amplitudes of the non-inverting/inverting strobe signal (STROB/STROB#) are +Vf and −Vf, respectively; and (IV) The amplitude of the data signal (DATA) is −Vf and the amplitudes of the non-inverting/inverting strobe signal (STROB/STROB#) are −Vf and +Vf, respectively.

In any one case, one of strobe signal (STROB/STROB#) cancels one set of the data signal (DATA) (denoted by a symbol "X") and another is added to the remaining set of the data signal (DATA) (denoted by a symbol "O"). Thus, the resulting voltage difference is +2Vf or −2Vf. When the data signal (DATA) is switching, the voltage difference at the input terminals of the input buffer will have twice the slew rate of the data signal (DATA). Once this voltage difference between the twice data signal and the sum of non-inverting/inverting strobe signals becomes zero, then the output signal (DOUT) is about to change its output value. Therefore, the point of a zero voltage difference level at the input terminals of the input buffer is closed to the input threshold voltage of the data signal (DATA).

Figure 7:
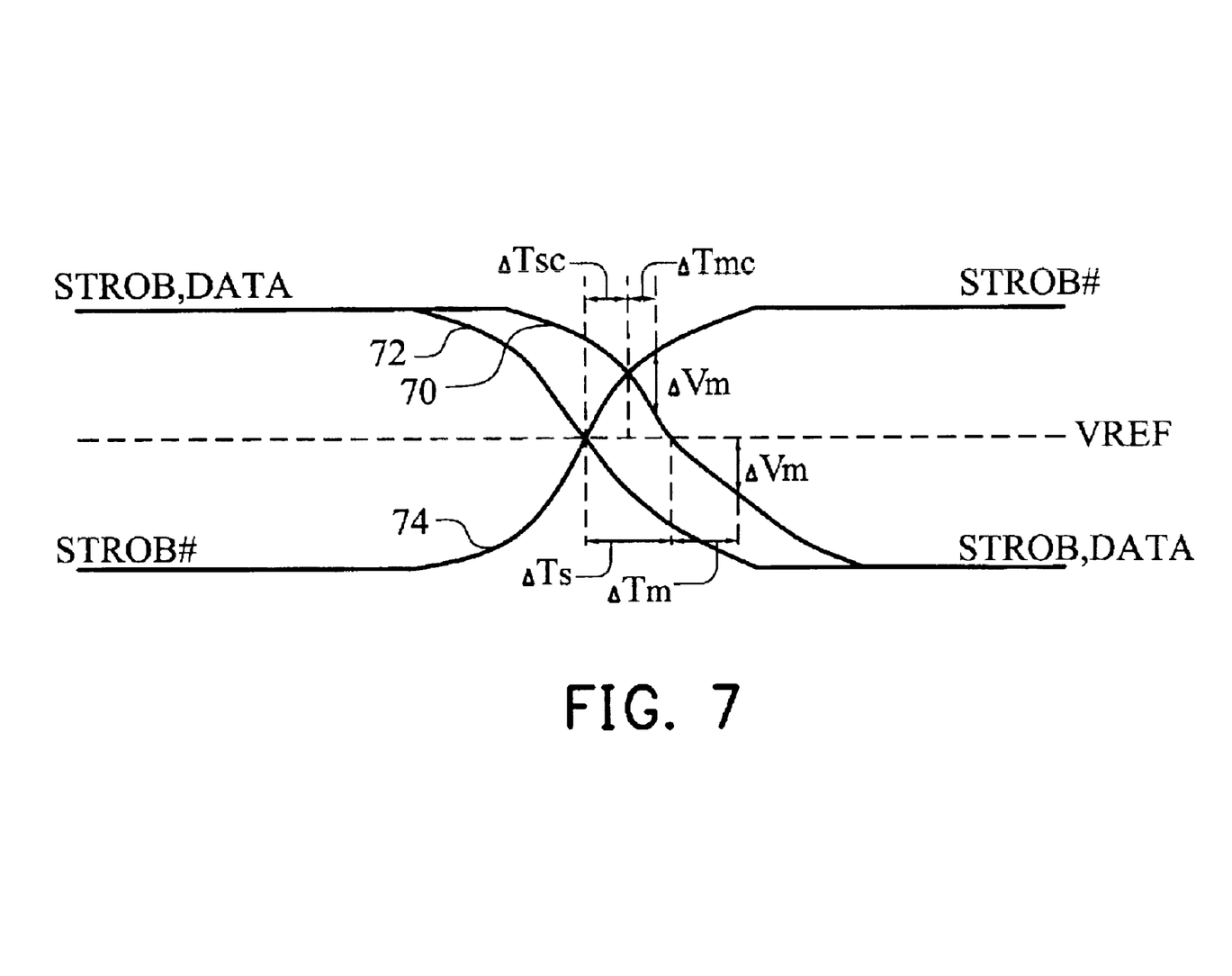
FIG. 7 is a schematic diagram illustrating the comparison of the skew of the data signal and the non-inverting/inverting strobe signal in the data comparator of the present invention and the conventional pseudo-differential data comparator.

As described above, the non-inverting/inverting strobe signals (STROB/STROB#) and the data signal (DATA) come from the same power/ground source. Thus, when most data signals have same level changes, the SSO effect occurs. One of the non-inverting strobe signal (STROB) and the inverting strobe signal (STROB#), which changes the same voltage level with the data signal (DATA), will also be delayed. As shown in FIG. 7, when most data signals (DATA) go from the high level to the low level, the non-inverting strobe signal (STROB) and the data signal (DATA) change their original waveform 72 to a delayed waveform 70 and the inverting strobe signal STROB almost remains unchanged.

If the currently used data comparator is a pseudo-differential comparator, according to FIG. 7, compared with the ideal case, the delay time of the data signal (DATA) reaching the reference voltage (the voltage (VREF) shown in FIG. 7) is $\Delta T_s$. In addition, the data signal (DATA) further requires a time $\Delta T_m$ to reach the differential voltage $\Delta V_m$ of the pseudo-differential comparator that makes the pseudo-differential comparator change its output level. Consequently, the total skew is $\Delta T_s + \Delta T_m$.

On the other hand, for the data comparator disclosed in the present invention, the delay time of the data signal (DATA) reaching the reference voltage (the sum of the strobe signals (STROB/STROB#)) is $\Delta T_{sc}$. In addition, the data signal (DATA) requires a time $\Delta T_{mc}$ to reach the differential voltage $\Delta V_m$ that make the data comparator of the present embodiment change its output level. Therefore, the total skew is $\Delta T_{sc} + \Delta T_{mc}$. Thus, compared with the conventional pseudo-differential comparator, the data comparator of the present invention can reduce the skew of $(\Delta T_s - \Delta T_{sc}) + (\Delta T_m - \Delta T_{mc})$.

The utilization of the non-inverting/inverting strobe signals (STROB/STROB#) as a dynamic reference voltage in the data comparator of the preferred embodiment can overcome the drawbacks of the conventional pseudo-differential and fully differential comparators. More specifically, such a scheme not only solves the timing issue of the output data due to the slew rate of the data signal and the variation of the reference voltage, but requires only one pin for each data signal. In addition, because the pair of complementary signals are transmitted through the same transmission circuits and the same I/O pads as those of the data signal and its falling/rising edges are aligned with those of the data signal, common-mode noise between the data signal and the strobe signals can also be eliminated and a better signal-to-noise ratio (SNR) can be acquired.

Figure 8:
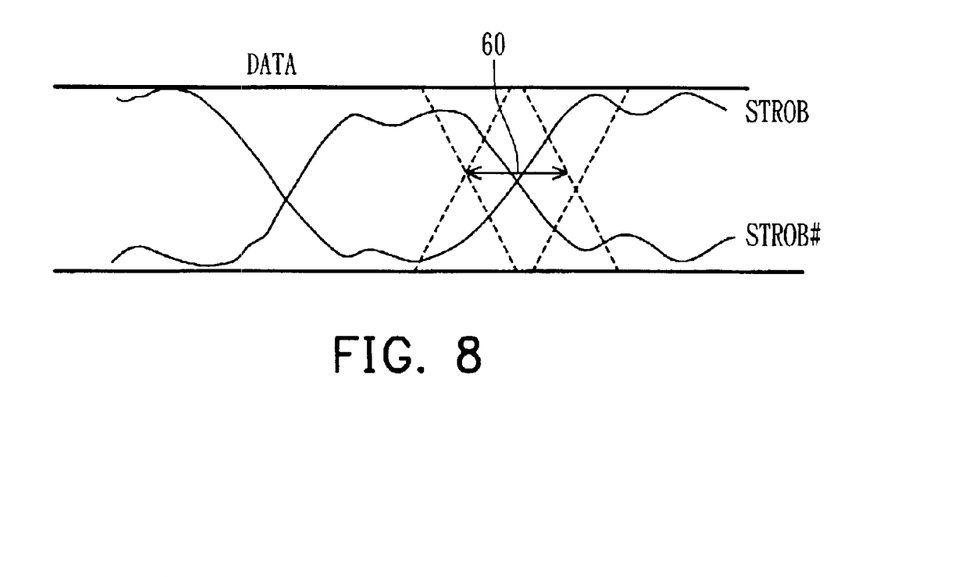
FIG. 8 is a schematic diagram illustrating the skew of the data signal and the non-inverting/inverting strobe signal.

In addition, the non-inverting/inverting strobe signal (STROB/STROB#) can be used to produce the latch clock signal (CLK/CLK#) for data latch after the predetermined process and the delay process. FIG. 8 is a schematic diagram illustrating the skew of the data signal (DATA) and the non-inverting/inverting strobe signals (STROB/STROB#). The increase of the slew amount 60 can cause the data signal (DATA) to shift across the crossing points of the non-inverting/inverting strobe signals (STROB/STROB#), which may cause sampling errors in data sampling. As described in FIG. 1, the non-inverting/inverting strobe signals (STROB/STROB#) are fed to the differential comparators 102a and 102b to generate the non-inverting/inverting sampling control signals (STB/STB#), and the non-inverting/inverting sampling control signals (STB/STB#) are delayed by delay elements 200a and 200b by a delay time to generate the non-inverting/inverting latch clock signals (CLK/CLK#). The non-inverting/inverting latch clock signals are used to control the data latch circuits $300_{11}$~$300_{n1}$ and $300_{12}$~$300_{n2}$ for latching the output data (DATA$_1$~DATA$_n$), thereby producing the latched data $D_{11}$~$D_{n1}$ and $D_{12}$~$D_{n2}$. Thus, the delay time of the delay elements 200a and 200b, which acts on the non-inverting/inverting sampling control signals (STB/STB#), is used to compensate for the signal skew, thereby preventing erroneous data sampling. On the other hand, in the preferred embodiment of the present invention, the non-inverting/inverting latch clock signals (CLK/CLK#) are used to concurrently latch each of the data signals and generate two latched data, thus the data rate doubles and high-speed data transmission is obtained.

Figure 9:
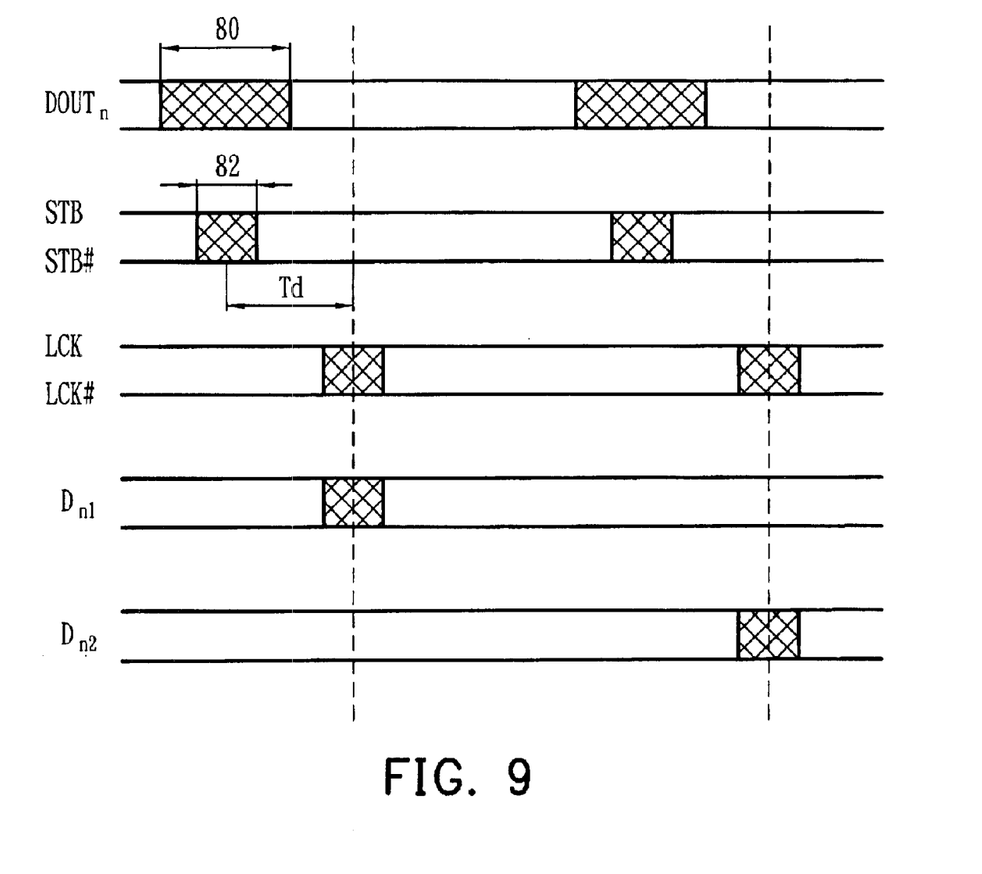
FIG. 9 is a timing diagram of the data output signal ($DOUT_n$), sampling control signals (STB/STB#), latch clock signals (CLK/CLK#) and latched data ($D_{n1}/D_{n2}$) in the preferred embodiment of the present invention.

FIG. 9 is a timing diagram of the data output signal (DOUT$_n$), sampling control signals (STB/STB#), latch clock signals (CLK/CLK#) and latched data ($D_{n1}/D_{n2}$) in the preferred embodiment of the present invention. The slash regions shown in FIG. 9 represent the ranges of the rising/falling edges of the corresponding signals. As shown in the figure, the edge range of the data output signal ($DOUT_n$) is denoted by numeral 80, which is caused by SSO, signal coupling, crosstalk, multiple paths and the power/ground noise-induced skew. In addition, the edge range of the non-inverting/inverting sampling control signals (STB/STB#) is denoted by numeral 82, which is caused by SSO and power/ground noise-induced skew. The latch clock signals (CLK/CLK#), derived from the sampling control signals (STB/STB#) and delayed by the delay time Td of the delay elements 200a and 200b, can acquire the latched data ($D_{n1}$) and the latched data ($D_{n2}$). The delay time Td is adjustable and the delay time provided by the delay element 200a or 200b can be different, depending on the different applications.

The advantages of the data transmission system disclosed in the preferred embodiment are summarized as follows:

1. In the present invention, the non-inverting/inverting strobe signals (STROB/STROB#) transmitted from the data output device can be used as a dynamic reference voltage for data sampling, which is superior to the conventional pseudo-differential or fully differential scheme. The input terminals of the four-input data comparator will see a sharper transition edge of the data signal than those in the conventional pseudo-differential scheme. In addition, the pseudo reference voltage created by the differential signal can be maintained stably if the differential signal has good waveform symmetry. In addition, each data signal is transmitted by one pin, which is favorable to the current chip design.

2. Since the pair of complementary signals and the other data signals go through the same PVT (process/voltage/temperature) variations, substrate and printed circuit board layout and traces, and are edge-aligned at their falling/rising edges, the pair of the data signal and the non-inverting strobe signal (STROB) or the pair of the data signal and the inverting strobe signal (STROB#) have a superior differential relation. Thus, the data comparator of the present invention can reject common-mode noise therebetween and maintain a relatively good noise margin.

3. Because the output timing of the data output signal will not be affected by the skew of the crossing points of the non-inverting/inverting strobe signals (STROB/STROB#), it is not necessary to worry about the extra skew between the latch clock signals (CLK/CLK#) and the data signal due to various routings for distributing the latch clock signals. However, it is necessary to let the non-inverting strobe signals (STROB/STROB#) have the same routing to try to keep them as symmetric as possible. The CTS branching devices distribution scheme of the latch clock signals (CLK/CLK#) can minimize the skew relative to the data signal due to routing. Therefore, the maximum data rate will be limited to the delay element and the setup/hold time margin of the data latch circuits. That is, $T_{data} \geq T_d + T_s + T_h$, where $T_{data}$ means the bit duration of the data signal, $T_d$ means the delay time of the delay element and $T_s$ and $T_h$ means the setup time margin and the hold time margin of the data latch circuits, respectively.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A data transmission system, comprising:
   a plurality of transmission lines;
   a data output device having a plurality of transmitter circuits coupled to first ends of the transmission lines, for transmitting at least a data signal and a pair of complementary signals having a non-inverting signal and an inverting signal to the transmission lines, the data signal and the pair of complementary signals being edge-aligned; and
   a data input device, coupled to second ends of the transmission lines and comprising:
   a first comparator receiving the data signal, the non-inverting signal and the inverting signal, for comparing twice the data signal with the sum of the non-inverting signal and the inverting signal and outputting an output signal according to a comparison result;
   a second comparator for comparing the non-inverting signal and the inverting signal and generating a non-inverting sampling control signal;
   a third comparator for comparing the inverting signal and the non-inverting signal and generating an inverting sampling control signal complementary to the non-inverting sampling control signal;
   a first delay element for generating a non-inverting latch clock signal by delaying the non-inverting sampling control signal by a first delay time;
   a second delay element for generating an inverting latch clock signal by delaying the inverting sampling control signal by a second delay time;
   a first data latch circuit for generating first latched data by latching the output signal based on the non-inverting latch clock signal; and
   a second data latch circuit for generating second latched data by latching the output signal based on the inverting latch clock signal.

2. The data transmission system as recited in claim 1, wherein the first delay time and the second delay time are determined by compensating a skew amount of the data signal.

3. The data transmission system as recited in claim 1, wherein the sum of the non-inverting signal and the inverting signal is a constant.

4. The data transmission system as recited in claim 1, wherein the first comparator comprises:
   a current source element having a first end coupled to a first voltage;
   a load element, configured in a current mirror structure, having a first end and a second end;
   a first transistor having a gate electrode receiving the data signal, a source electrode coupled to a second end of the current source element and a drain electrode coupled to the first end of the load element;
   a second transistor having a gate electrode receiving the data signal, a source electrode coupled to the second end of the current source element and a drain electrode coupled to the first end of the load element;
   a third transistor having a gate electrode receiving the non-inverting signal, a source electrode coupled to the second end of the current source element and a drain electrode coupled to the second end of the load element; and a fourth transistor having a gate electrode receiving the inverting signal, a source electrode coupled to the second end of the current source element and a drain electrode coupled to the second end of the load element;

wherein the output signal is provided at a node coupled between the first transistor and the load element.

5. The data transmission system as recited in claim 1, wherein the first data latch circuit includes a plurality of first data latched circuits and the second data latch circuit includes a plurality of second data latched circuits, and the data input device further comprises a plurality of CTS branching devices, coupled to the first delay element and the second delay element, for distributing the non-inverting latch clock signal to the first data latch circuits and distributing the inverting latch clock signal to the second data latch circuits.

6. A data transmission system, comprising:

a plurality of transmission lines;

a data output device, coupled to the transmission lines, for transmitting at least a data signal, a non-inverting signal and an inverting signal to the transmission lines, the data signal, the non-inverting signal and the inverting signal being edge-aligned; and a data input device for receiving the data signal, the non-inverting signal and the inverting signal through the transmission lines, comprising:

a first comparator for generating an output signal according to the data signal, the non-inverting signal and the inverting signal;

a second comparator for comparing the non-inverting signal and the inverting signal and generating a non-inverting sampling control signal;

a delay element for generating a non-inverting latch clock signal by delaying the non-inverting sampling control signal by a delay time; and a data latch circuit for generating latched data by latching the output signal based on the non-inverting latch clock signal.

7. The data transmission system as recited in claim 6, wherein the delay time is determined by compensating a skew amount of the data signal.

8. The data transmission system as recited in claim 6, wherein the output signal is generated by comparing twice the data signal with the sum of the non-inverting signal and the inverting signal.

9. The data transmission system as recited in claim 6, wherein the data latch circuit includes a plurality of data latch circuits, and the data input device further comprises a CTS branching device, coupled to the delay element, for distributing the non-inverting latch clock signal to the data latch circuits.

10. A data input buffer for receiving a data signal, a non-inverting signal and an inverting signal, comprising:

a first comparator for generating an output signal according to the data signal, the non-inverting signal and the inverting signal;

a second comparator for comparing the non-inverting signal and the inverting signal and generating a non-inverting sampling control signal;

a first delay element for generating a non-inverting latch clock signal by delaying the non-inverting sampling control signal by a first delay time; and a first data latch circuit for generating first latched data by latching the output signal based on the non-inverting latch clock signal.

11. The data input buffer as recited in claim 10, where the first comparator compares twice the data signal with the sum of the non-inverting signal and the inverting signal and outputs the output signal according to a comparison result.

12. The data input buffer as recited in claim 11, wherein the sum of the non-inverting signal and the inverting signal is a constant.

13. The data input buffer as recited in claim 10, wherein the first delay time is determined by compensating a skew amount of the data signal.

14. The data input buffer as recited in claim 10, further comprising:

a third comparator for comparing the inverting signal and the non-inverting signal and generating an inverting sampling control signal complementary to the non-inverting sampling control signal;

a second delay element for generating an inverting latch clock signal by delaying the inverting sampling control signal by a second delay time; and a second data latch circuit for generating second latched data by latching the output signal based on the inverting latch clock signal.

15. The data input buffer as recited in claim 14, wherein the second delay time is determined by compensating a skew amount of the data signal.

16. The data input buffer as recited in claim 14, wherein the first data latch circuit includes a plurality of first data latched circuits and the second data latch circuit includes a plurality of second data latched circuits, and the data input buffer further comprises a plurality of CTS branching devices, coupled to the first delay element and the second delay element, for distributing the non-inverting latch clock signal to the first data latch circuits and distributing the inverting latch clock signal to the second data latch circuits.

* * * * *